(12) United States Patent
Fujioka et al.

(10) Patent No.: US 12,064,767 B2
(45) Date of Patent: Aug. 20, 2024

(54) BIOCHEMICAL CARTRIDGE AND BIOCHEMICAL ANALYSIS DEVICE

(71) Applicant: HITACHI HIGH-TECH CORPORATION, Tokyo (JP)

(72) Inventors: Michiru Fujioka, Tokyo (JP); Sakuichiro Adachi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 734 days.

(21) Appl. No.: 17/274,279

(22) PCT Filed: Oct. 19, 2018

(86) PCT No.: PCT/JP2018/039027
§ 371 (c)(1),
(2) Date: Mar. 8, 2021

(87) PCT Pub. No.: WO2020/079834
PCT Pub. Date: Apr. 23, 2020

(65) Prior Publication Data
US 2021/0339256 A1   Nov. 4, 2021

(51) Int. Cl.
*B01L 3/00*   (2006.01)
*G01N 35/08*   (2006.01)

(52) U.S. Cl.
CPC ........ *B01L 3/502792* (2013.01); *G01N 35/08* (2013.01); *B01L 2200/0605* (2013.01);
(Continued)

(58) Field of Classification Search
CPC ....... B01L 3/502792; B01L 2200/0605; B01L 2200/0673; B01L 2400/0427;
(Continued)

(56) References Cited

U.S. PATENT DOCUMENTS

| 2010/0307917 A1 | 12/2010 | Srinivasan et al. |
| 2016/0125780 A1 | 5/2016 | Msser et al. |
| 2017/0266653 A1* | 9/2017 | Pollack ................. B03C 1/0335 |

FOREIGN PATENT DOCUMENTS

| CN | 1769896 A | * 5/2006 | ........ B01L 3/502784 |
| JP | 2006-329901 A | 12/2006 | |

(Continued)

OTHER PUBLICATIONS

International Search Report, PCT/JP2018/039027, Jan. 22, 2019 (2 pgs.).
(Continued)

*Primary Examiner* — Nicholas A Smith
*Assistant Examiner* — Sommer Yousef Osman
(74) *Attorney, Agent, or Firm* — Volpe Koenig

(57) ABSTRACT

To enable taking in a biological sample at a position a predetermined distance away from an EWOD electrode, a biochemical cartridge, including a droplet passage on which a plurality of EWOD electrodes is arranged along a direction in which a sample droplet that is a droplet including a biological sample is transported, the plurality of EWOD electrodes configured to transport the sample droplet, and a sample take-in unit having a predetermined distance from an EWOD electrode at a tail end of the droplet passage, the sample take-in unit being provided at a position at which the biological sample in the sample droplet is taken in. When the biological sample is taken in, the sample take-in unit is located at a position lower than the droplet passage having the EWOD electrode at the tail end, and an area between the droplet passage and the sample take-in unit is smoothly connected.

20 Claims, 11 Drawing Sheets

(52) U.S. Cl.
    CPC .................. *B01L 2200/0673* (2013.01); *B01L 2400/0427* (2013.01)

(58) Field of Classification Search
    CPC ............ B01L 2400/0457; G01N 35/08; G01N 27/44756; G01N 35/1004; G01N 2035/1039; G01N 1/00; G01N 37/00
    See application file for complete search history.

(56) References Cited

FOREIGN PATENT DOCUMENTS

| | | | | |
|---|---|---|---|---|
| JP | 2009-534653 A | 9/2009 | | |
| JP | 2018077056 A | * 5/2018 | ............... | G01N 1/00 |
| JP | 6354114 B1 | 7/2018 | | |
| JP | 2019072652 A | * 5/2019 | ............... | B01J 19/00 |
| WO | 2007/120241 A2 | 10/2007 | | |
| WO | WO-2010009463 A2 | * 1/2010 | .......... | B01F 13/0071 |
| WO | WO-2014004908 A1 | * 1/2014 | ........ | B01L 3/502715 |
| WO | 2014/083622 A1 | 6/2014 | | |
| WO | 2016/161402 A1 | 10/2016 | | |
| WO | WO-2016161402 A1 | * 10/2016 | ........ | B01L 3/502761 |
| WO | WO-2017078059 A1 | * 5/2017 | ............... | B01J 19/00 |

OTHER PUBLICATIONS

German Office Action issued on Nov. 29, 2022 for German Patent Application No. 112018007860.4.

* cited by examiner

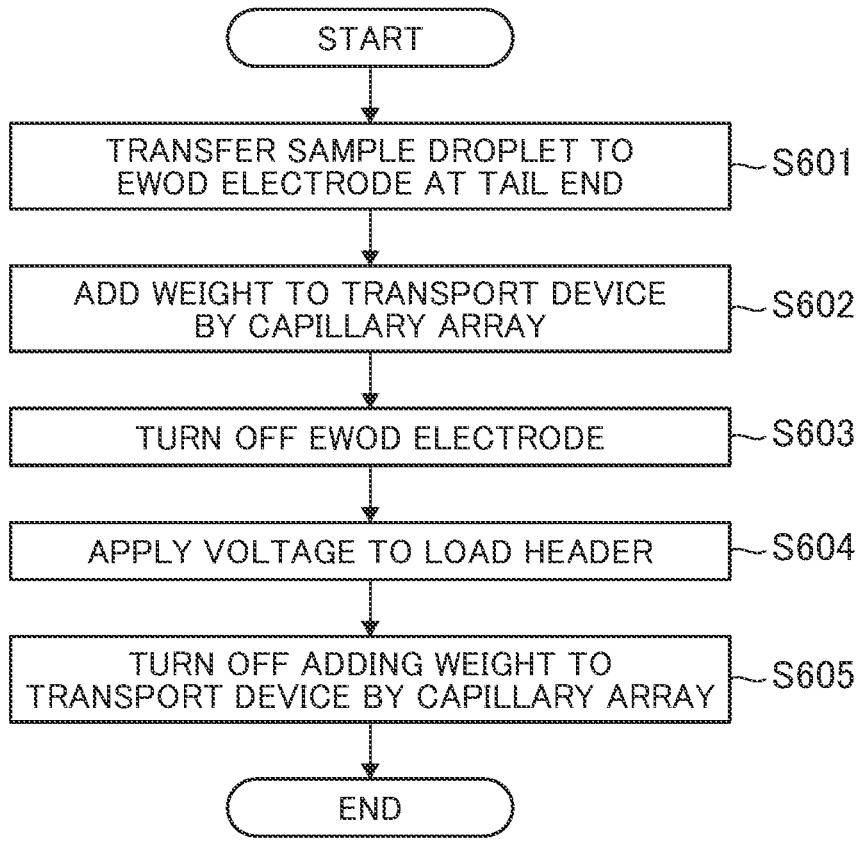

BIOCHEMICAL CARTRIDGE AND BIOCHEMICAL ANALYSIS DEVICE

TECHNICAL FIELD

The present invention relates to a biochemical cartridge including synthesizing, as necessary, a biological sample extracted by biochemical reactions for analysis and a biochemical analysis device including this biochemical cartridge.

BACKGROUND ART

Genomic analysis such as base sequence analysis and polymorphism analysis is remarkably important in the field of biological studies, medical fields such as gene therapy and diagnosis and the development of molecular target drugs, and medical jurisprudence such as DNA examination. In genomic analysis, the following processes are performed: 1) the process of extracting nucleic acid from a specimen; 2) the process of amplifying the extracted nucleic acid for labeling; and 3) the process of electrophoresis reading the base sequence of the nucleic acid. In process 2), the nucleic acid mixed with the reagent is kept at a predetermined temperature, a primer anneals the nucleic acid to be a target, and the nucleic acid is amplified.

Patent Literature 1 discloses the use of a technique of Electro Wetting On Dielectric (EWOD) for process 2). That is, Patent Literature 1 discloses that nucleic acid or the droplet of a reagent is transported in a droplet microactuator using EWOD, the nucleic acid is amplified, and then the nucleic acid is analyzed on the downstream side by electrophoresis.

CITATION LIST

Patent Literature

Patent Literature 1: Japanese Unexamined Patent Application Publication (Translation of PCT Application) No. 2009-534653

SUMMARY OF INVENTION

Technical Problem

However, Patent Literature 1 discloses no specific method of supplying the nucleic acid after amplification to an electrophoretic device such as a capillary sequencer. The droplet is transported at a few tens of volts of an application voltage in EWOD, whereas in order to take in a biological sample, amplified nucleic acid, for example, in a droplet into the capillary array of the capillary sequencer, for example, a few kilovolts of an application voltage is needed, and this destroys EWOD electrodes and any other components, resulting in no reuse of EWOD for transporting droplets.

Therefore, an object of the present invention is to provide a biochemical cartridge that can take in a biological sample at a position a predetermined distance away from an EWOD electrode and a biochemical analysis device equipped with the biochemical cartridge.

Solution to Problem

In order to achieve the object, the present invention is a biochemical cartridge including a droplet passage on which a plurality of EWOD electrodes is arranged along a direction in which a sample droplet that is a droplet including a biological sample is transported, the plurality of EWOD electrodes configured to transport the sample droplet, and a sample take-in unit having a predetermined distance from an EWOD electrode at a tail end of the droplet passage, the sample take-in unit being provided at a position at which the biological sample in the sample droplet is taken in. When the biological sample is taken in, the sample take-in unit is located at a position lower than the droplet passage having the EWOD electrode at the tail end, and an area between the droplet passage and the sample take-in unit is smoothly connected.

The present invention is a biochemical analysis device that takes in a biological sample for analysis, the device including the biochemical cartridge.

Advantageous Effects of Invention

According to the present invention, a biochemical cartridge that can take in a biological sample at a position a predetermined distance away from an EWOD electrode and a biochemical analysis device equipped with the biochemical cartridge can be provided.

FIG. 6 is a flowchart illustrating an operation according to the first embodiment.

DESCRIPTION OF EMBODIMENTS

Figure 1:
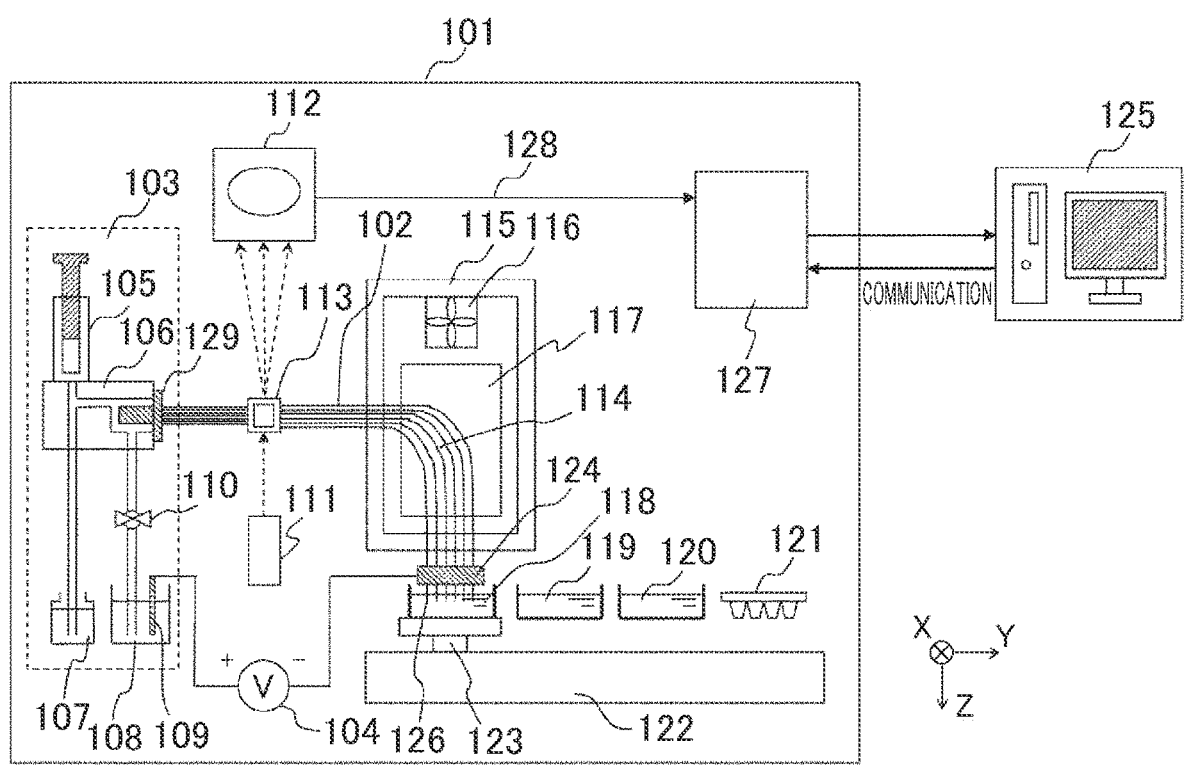
FIG. 1 is a diagram showing the overall structure of a biochemical analysis device according to a first embodiment.

In the following, embodiments of a biochemical analysis device according to the present invention will be described with reference to the drawings. Note that in order to indicate the orientations in the drawings, XYZ coordinate systems are written in the drawings.

First Embodiment

FIG. 1 shows the overall structure of a biochemical analysis device. In the present embodiment, a biochemical analysis device is exemplified, the biochemical analysis device performing electrophoresis amplifying nucleic acid extracted from a specimen, labeling the nucleic acid, and then reading the base sequence of the nucleic acid. In order to amplify nucleic acid, the nucleic acid mixed with a reagent is kept at a predetermined temperature, or in order to perform electrophoresis, the amplified nucleic acid is supplied to a thin tube called a capillary.

A device main body 101 is connected to a control computer 125 with a communication cable. The control computer 125 accepts an input from an operator, controls the functions of the biochemical analysis device, gives and receives data detected at the device main body 101, and displays data that is given and received. The device main body 101 includes a capillary array 114, a pump mechanism 103, a thermostat 115, the conveyer 122, a high-voltage power supply 104, a light source 111, and an optical detector 112. In the following, these components will be described.

The capillary array 114 is a replacement member composed of one or a plurality (e.g. two to 96) of capillaries 102, including a load header 124, a detecting unit 113, and a capillary head 129. At one end of the capillary array 114, the load header 124 is provided to supply a sample into the capillary 102, forming a cathode end 126 to which a negative voltage is applied. At the other end of the capillary array 114, a plurality of capillaries 102 is bundled in one by the capillary head 129, and is connected in a pressure-proof secret structure to a gel block 106. The detecting unit 113, to which laser light is applied, is provided between the load header 124 and the capillary head 129.

The capillary 102 is a glass tube having an inner diameter a few tens to a few hundreds μm and an outer diameter of a few hundreds μm. In order to improve the strength of the capillary 102, the surface is covered with a polyimide coating. However, the polyimide coating is removed from the detecting unit 113 and the vicinity of the detecting unit 113, to which laser light is applied. The inside of the capillary 102 is filled with a separation medium that separates DNA molecules in the sample. The separation medium is a polyacrylamide separation gel, for example.

The pump mechanism 103 is composed of a syringe 105 and a mechanical system that pressurizes the syringe 105. The gel block 106 is a connecting unit that joins the syringe 105, the capillary array 114, an anode buffer container 108, and a separation medium container 107. The motor-operated valve 110 is closed, the syringe 105 is pressed in, and the separation medium in the syringe 105 is injected into the inside of the capillary 102.

The thermostat 115 has a heater 117 and a fan 116 for controlling the temperature of the capillary array 114, and is covered with a heat insulator ion order to keep the temperature in the thermostat 115 constant. Controlling the temperature in the thermostat 115 keeps the temperature in the most part of the capillary array 114 at a constant temperature, at a temperature of 60° C., for example.

The conveyer 122 has three electric motors and linear actuators, and the conveyer 122 is movable in three axial directions, vertical, lateral, and back-and-forth directions. On a moving stage 123 on the conveyer 122, at least one more containers are installed. The conveyer 122 transports a buffer container 118, a washing container 119, a waste fluid container 120, and a biochemical cartridge 121 on the moving stage 123 to the cathode end 126 of the capillary 102. In the buffer container 118, an electrophoretic buffer solution is put. The washing container 119 is used for washing the capillary 102. Into the waste fluid container 120, the separation medium in the capillary 102 is discharged. In the biochemical cartridge 121, a biological sample, nucleic acid and a reagent, for example, is put. The nucleic acid amplified in the biochemical cartridge 121 is taken in from the cathode end 126 of the capillary 102 into the capillary array 114. The biochemical cartridge 121 will be described later referring to FIG. 2 to FIG. 5.

The high-voltage power supply 104 is connected to an anode electrode 109 in the anode buffer container 108 and the load header 124, and applies a high voltage to the separation medium in the capillary 102.

The light source 111 applies laser light that is coherent light as pumping light to the detecting unit 113. The optical detector 112 optically detects fluorescence emitted from the sample in the detecting unit 113. The detected optical data 128 is transferred to the control computer 125 through a control substrate 127.

Figure 2:
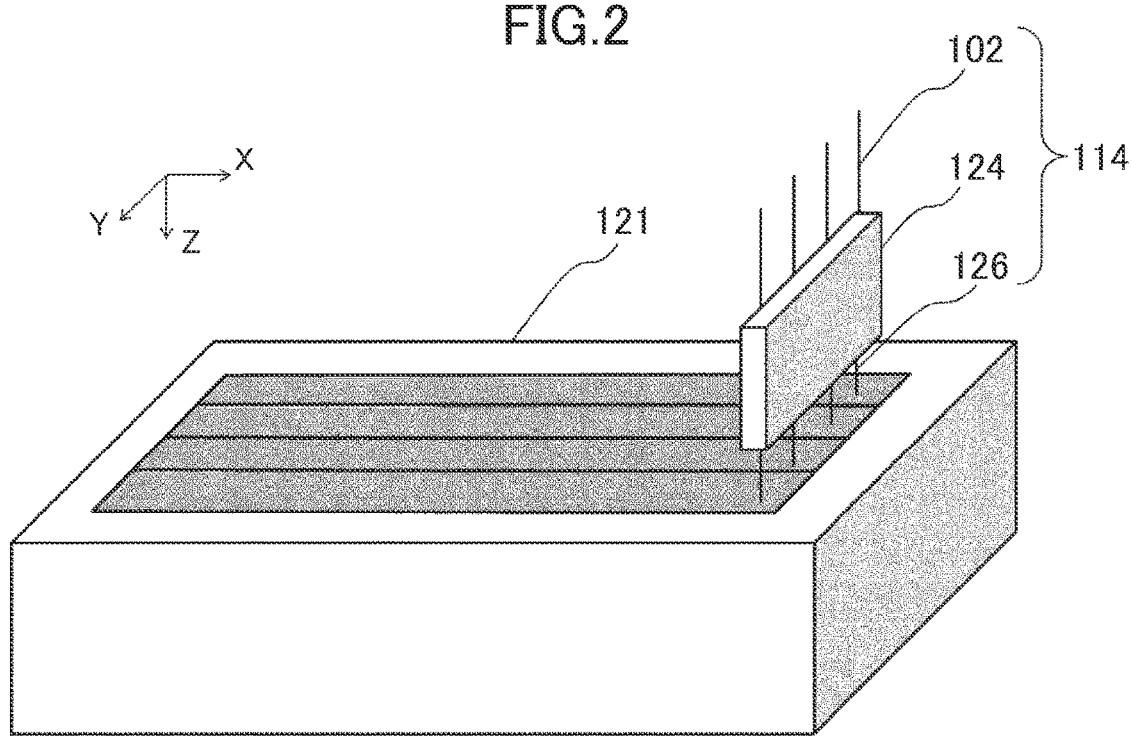
FIG. 2 is a perspective view illustrating a biochemical cartridge according to the first embodiment.

Referring to FIG. 2, the biochemical cartridge 121 will be described. FIG. 2 is a perspective view of the biochemical cartridge 121. The biochemical cartridge 121 is provided with one or a plurality, four, for example, of passages in which nucleic acid is amplified, and the cathode end 126 of the capillary 102 is inserted into each of the passages. Note that in FIG. 2, the long direction of the passage is an X-direction, the direction in which the passages are arranged is a Y-direction, and the direction into which the cathode end 126 is inserted is a Z-direction.

Figure 3:
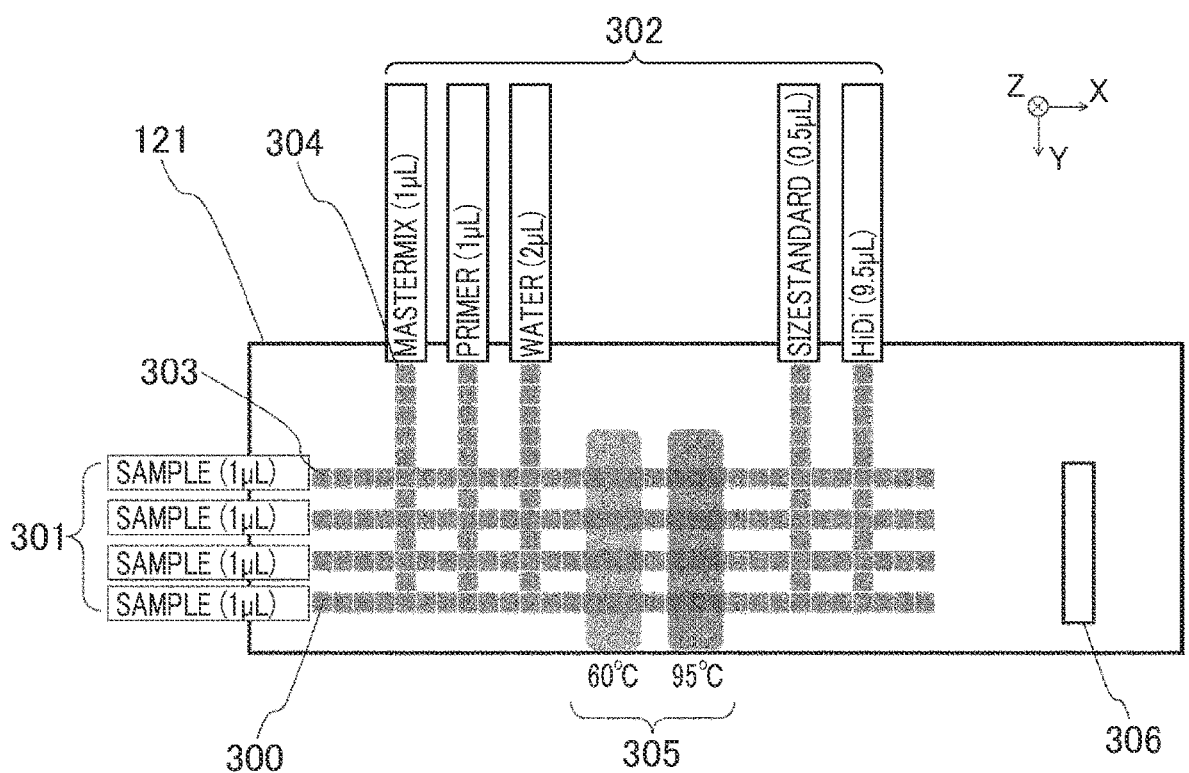
FIG. 3 is a plan view illustrating a sample passage, a reagent passage, and a sample take-in unit in the biochemical cartridge according to the first embodiment.

Referring to FIG. 3, the structure in the biochemical cartridge 121 will be described. FIG. 3 is a plan view of the inside of the biochemical cartridge 121. In the biochemical cartridge 121 in FIG. 3, a sample chamber 301, a reagent chamber 302, a sample passage 303, and a reagent passage 304 are provided. A plurality, four, for example, of the sample chambers 301 are provided, and one microliter, for example, of nucleic acid to be amplified is put in the sample chambers 301 alternatively, ten microliters of nucleic acid may be put in the sample chamber 301, and one microliter of nucleic acid may be separated from ten microliters of the nucleic acid for use. One or a plurality of, five, for example, reagent chambers 302 are provided. In the reagent chambers 302, reagents used for amplifying the nucleic acid, are put, including a primer, dNTP, a buffer solution, water, an enzyme, a denaturing agent, and a size standard DNA, for example.

The sample passages 303 are individually connected to the sample chambers 301, and a droplet containing nucleic acid is transported. In the present embodiment, the direction in which a droplet containing nucleic acid is transported is the X-direction. In the case in which a technique of Electro Wetting On Dielectric (EWOD) is used for transporting the droplet, the sample passage 303 is a transport device having an EWOD electrode 300 for transporting the droplet. EWOD is a technique in which a voltage is applied across a droplet disposed on a water-repellent film that is a film of water repellency and an EWOD electrode that is an electrode provided under the water-repellent film, the surface tension of the droplet is controlled, and thus the droplet is transported on the water-repellent film.

Figure 4:
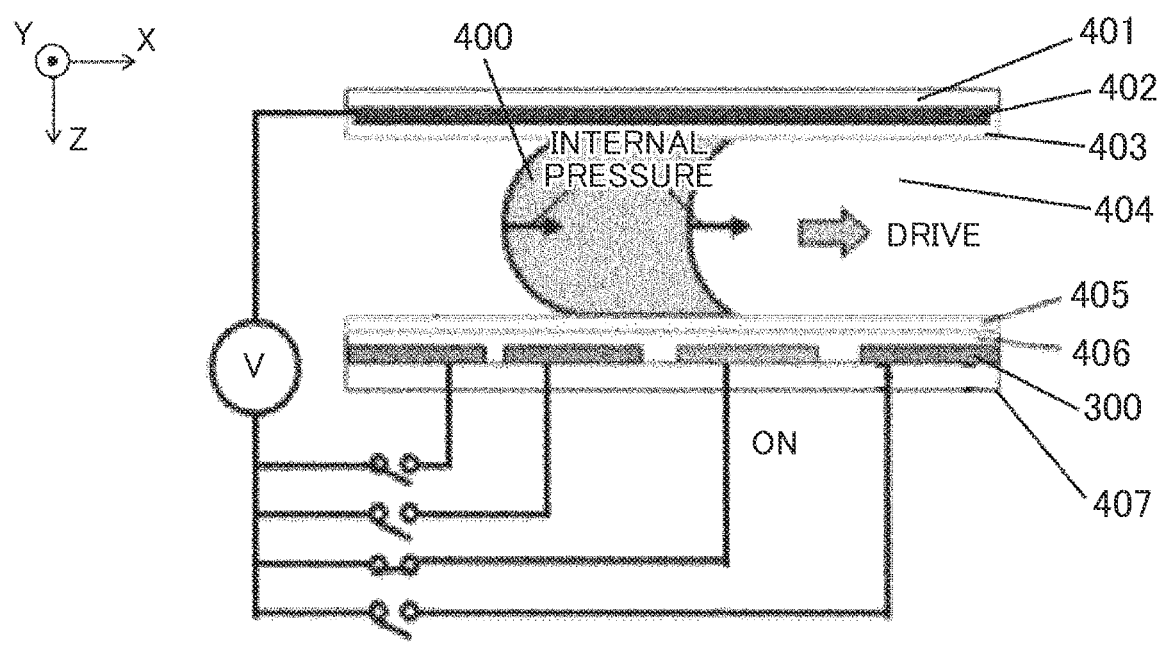
FIG. 4 is a cross sectional view illustrating an Electro Wetting On Dielectric (EWOD) device according to the first embodiment.

Referring to FIG. 4, an example transport device using EWOD will be described. FIG. 4 is a X-Z cross sectional view of a passage using EWOD. The transport device has a top plate 401, an upper electrode 402, an upper water-repellent film 403, a lower water-repellent film 405, an insulating film 406, an EWOD electrode 300, and an under plate 407. The top plate 401 and the under plate 407 are disposed in parallel. On the under surface of the top plate 401, the upper electrode 402 and the upper water-repellent film 403 are provided, and on the top surface of the under plate 407, a plurality of EWOD electrodes 300, the insulating film 406, and the lower water-repellent film 405 are provided. Note that when a plurality of EWOD electrodes 300 is disposed at least one of the top plate 401 and the under plate 407, the transportation of a droplet 400 is possible.

The plurality of EWOD electrodes 300 is arranged along the direction in which the droplet 400 is transported. The EWOD electrode 300 is covered with the insulating film 406 having a thickness of a few hundreds μm, for example, such that a voltage can be individually applied to the EWOD electrodes 300. Preferably, a space between the upper water-repellent film 403 and the lower water-repellent film 405 is filled with a fluid 404 that is not mixed with the droplet 400 to be transported. Note that the transportation of the droplet 400 is possible without the fluid 404.

In such a transport device, when a voltage of a few tens of volts is applied to the EWOD electrode 300 located near the droplet 400, the surface tension of the droplet 400 on the side of the EWOD electrode 300 to which the voltage is applied is changed, and an internal pressure is generated in the droplet 400. Since the generated internal pressure drives the droplet 400 in the direction of an arrow in FIG. 4, the droplet 400 is transported. That is, the droplet 400 is transported to the side of the EWOD electrode 300 to which the voltage is applied.

Again referring to the description of FIG. 3. The reagent passages 304 are individually connected to the reagent chambers 302, and the droplet of the reagent is transported. In the present embodiment, the direction in which the droplet of the reagent is transported is the Y-direction. In the case in which EWOD is used for transporting the droplet of the reagent, the reagent passage 304 has a plurality of EWOD electrodes 300 similarly to the sample passage 303. The reagent passage 304 intersects with the sample passage 303, and the droplet containing nucleic acid is mixed with the droplet of the reagent at the intersection of the reagent passage 304 and the sample passage 303. Note that an angle at which the reagent passage 304 intersects with the sample passage 303 is not limited to an angle of 90 degrees as shown in FIG. 3.

The EWOD electrodes 300 on the sample passage 303 and the reagent passage 304 can separately apply a voltage, and thus two or more droplets can also be transported simultaneously. The direction in which the droplet is transported is not limited to one direction, and the droplet may be reciprocated. For example, mixing nucleic acid with the reagent may be promoted by reciprocating the droplet between the intersection of the sample passage 303 and the reagent passage 304 and the point adjacent to the intersection.

In the midway point of the sample passage 303, a temperature control region 305 is provided. The temperature control region 305 is one or more regions in which the temperature is kept at a predetermined temperature, a region kept at a temperature of 60° C., for example, and a region kept at a temperature of 95° C. The droplet having the nucleic acid and the reagent mixed is transported to the temperature control region 305, and the nucleic acid is amplified by a Polymerase Chain Reaction (PCR) or a cycle sequence reaction, for example. Note that the droplet may be reciprocated between the regions kept at different temperatures, the region at a temperature of 60° C. and the region at a temperature of 95° C., for example. The droplet having the nucleic acid amplified is labelled to be a sample droplet. Note that the sample passage 303 on which the sample droplet is transported is also referred to as a droplet passage.

At the tip of the sample passage 303, the sample take-in unit 306 is provided. In the sample take-in unit 306, the nucleic acid in the sample droplet is taken in the inside of the capillary array 114. That is, the cathode end 126 of the capillary 102 is inserted at the position of the sample take-in unit 306. The position of the sample take-in unit 306 is a position at which a predetermined distance away from the EWOD electrode 300A at the tail end in the sample passage 303, i.e., the position having a distance to keep electrical insulation from the EWOD electrode 300A at the tail end when a voltage of a few kilovolts is applied to the load header 124 of the capillary array 114, for example.

Figure 5A:
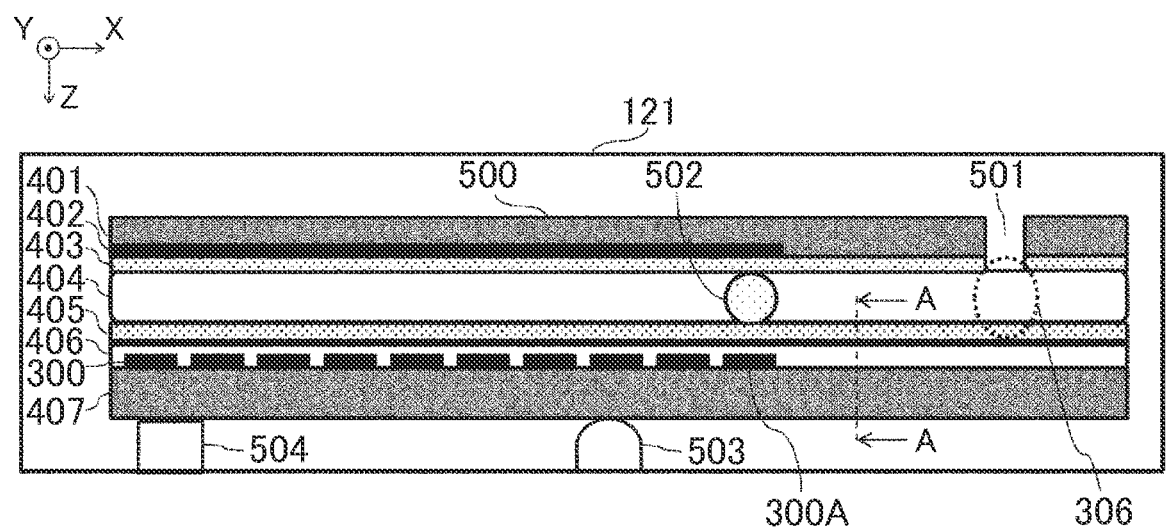
FIGS. 5A and 5B are cross sectional views illustrating the sample take-in unit according to the first embodiment.
Figure 5B:
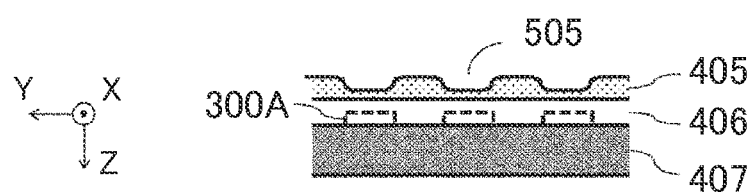

Referring FIG. 5, a transport device 500 in the biochemical cartridge 121 will be described. FIG. 5(a) is a X-Z cross sectional view of the transport device 500 in the biochemical cartridge 121. FIG. 5(b) is a cross sectional view taken along line A-A indicated by arrows in FIG. 5(a). The transport device 500 has the top plate 401, the upper electrode 402, the upper water-repellent film 403, the lower water-repellent film 405, the insulating film 406, the EWOD electrode 300, the under plate 407, and an opening 501. The top plate 401, the upper electrode 402, the upper water-repellent film 403, the lower water-repellent film 405, the insulating film 406, the EWOD electrode 300, the under plate 407 have the same configurations shown in FIG. 4, and the sample droplet 502 is transported by such configurations. The opening 501 is provided at the position of the sample take-in unit 306, and the cathode end 126 of the capillary 102 is inserted. The transport device comprises the droplet passage and the sample take-in unit, a linear passage for the sample droplet within the transport device extending in an x-axis direction through the droplet passage and across the predetermined distance to the sample take-in unit. Note that the sample take-in unit 306 is indicated by a dotted-line ellipse in the drawing.

Between the biochemical cartridge 121 and the transport device 500, a pivot 503 and a support unit 504 are provided. The pivot 503 rotatably supports the transport device 500 about the Y-axis at a position on the +X-direction side from the center of gravity of the transport device 500. The support unit 504 supports the transport device 500 to be kept horizontally together with the pivot 503, and disposed at the position on the −X-direction side from the pivot 503. That is, when no weight is added to the transport device 500, the transport device 500 is kept horizontally, whereas when a weight in the +Z-direction is added to the transport device 500 at a position on the +X-direction side from the pivot 503, the transport device 500 is inclined to the horizontal plane. The transport device 500 is inclined, and then the sample take-in unit 306 is located lower than the droplet passage including the EWOD electrode 300A at the tail end. The area between the droplet passage and the sample take-in unit 306 is continued smoothly by the lower water-repellent film 405.

Note that on the lower water-repellent film 405 between the droplet passage and the sample take-in unit 306, a groove 505 as shown in FIG. 5B may be provided. The groove 505 is provided from the position at which the EWOD electrode 300 is arranged along the X-direction, i.e., along the droplet passage. The groove 505 is provided between the droplet passage and the sample take-in unit 306, and thus the sample droplet 502 can be prevented from devoting from the Y-direction. The pivot 503 and the support unit 504 may be provided between the moving stage 123 and the biochemical cartridge 121, not between the biochemical cartridge 121 and the transport device 500. In this case, the biochemicartridge 121 is inclined to the horizontal plane or kept horizontally depending on the presence or absence of adding a weight.

Referring to FIG. 6, the operation according to the present embodiment will be described.

S601

The application voltage of the transport device 500 to the EWOD electrode 300 is controlled, and the sample droplet 502 is transported to the position of the EWOD electrode 300A at the tail end. FIG. 5A shows the manner in which the sample droplet 502 is transported to the position of the EWOD electrode 300A at the tail end.

S602

Figure 7:
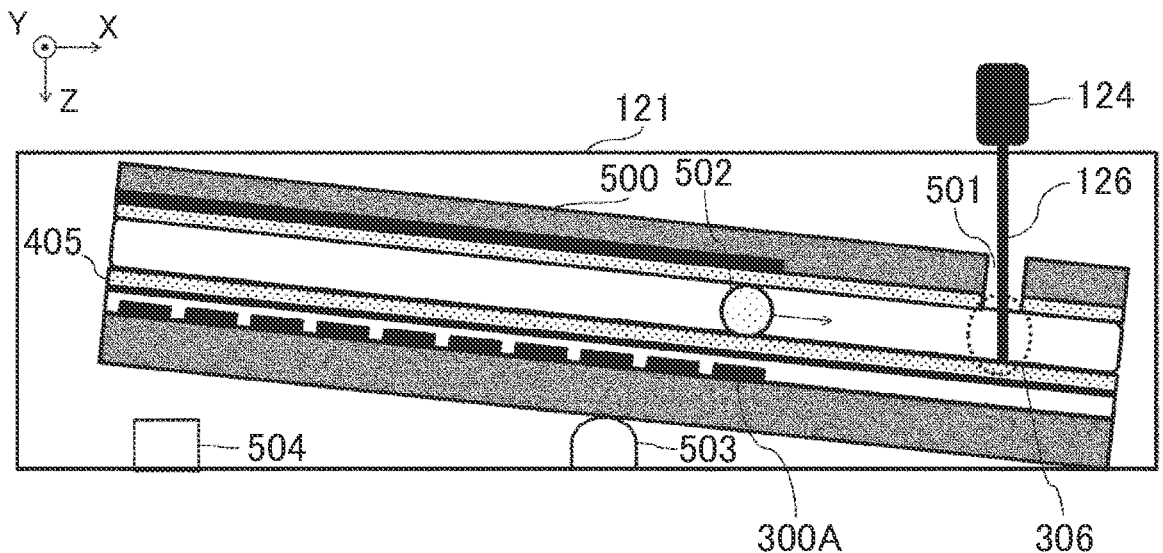
FIG. 7 is a cross sectional view illustrating an operation according to the first embodiment.

The capillary array 114 moves in the +Z-direction, passes the opening 501, and then contacts the lower water-repellent film 405. The transport device 500 receives the weight added by the capillary array 114 in the +Z-direction, and is inclined to the horizontal plane as the contacting part with the pivot 503 is the rotation axis. FIG. 7 shows the manner in which the transport device 500 is inclined. The transport device 500 is inclined, and in the sample droplet 502, driving force occurs in the direction of an arrow in FIG. 7. However, since a voltage is applied to the EWOD electrode 300, the sample droplet 502 is retained at the position of the EWOD electrode 300A at the tail end.

S603

Figure 8:
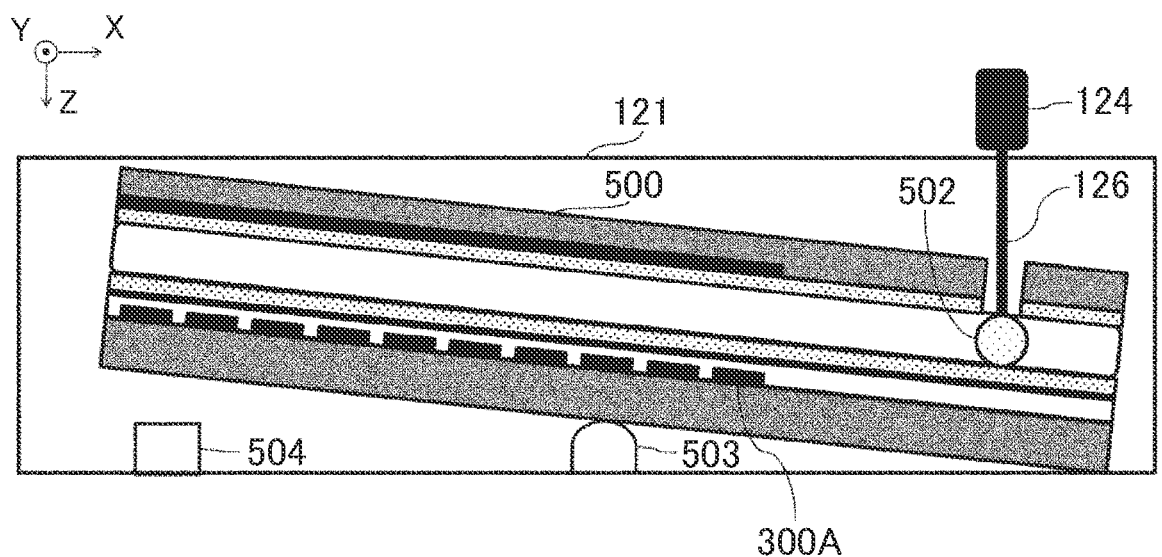
FIG. 8 is a cross sectional view illustrating an operation according to the first embodiment.

The application voltage to the EWOD electrode 300 is turned into an off state or a ground state. When the application voltage is turned into the off state or the ground state, the force retaining the sample droplet 502 at the position of the EWOD electrode 300A at the tail end is eliminated, and the sample droplet 502 starts to move in the direction of the arrow in FIG. 7. The sample droplet 502 moves along the top surface of the lower water-repellent film 405, and stops at the position of the cathode end 126 of the capillary 102 due to surface tension. FIG. 8 shows the manner in which the sample droplet 502 stops at the position of the cathode end 126 of the capillary 102. Note that a voltage of the order of a few volts may be applied to the capillary 102 in order to more easily retain the sample droplet 502 at the position of the cathode end 126 of the capillary 102.

S604

A voltage of a few kilovolts is applied to the load header 124. With the application of a voltage to the load header 124, a predetermined amount of the nucleic acid in the sample droplet 502 stopping at the position of the cathode end 126 of the capillary 102 is taken in the inside of the capillary array 114. After a predetermined amount of the nucleic acid is taken in the inside of the capillary array 114, the application voltage to the load header 124 is turned off.

S605

After the application voltage to the load header 124 is turned off, the capillary array 114 moves in the −Z-direction, and leaves the lower water-repellent film 405. The capillary array 114 leaves the lower water-repellent film 405, this eliminates the weight added to the transport device 500, and the transport device 500 is to return to the horizontal state.

Figure 9:
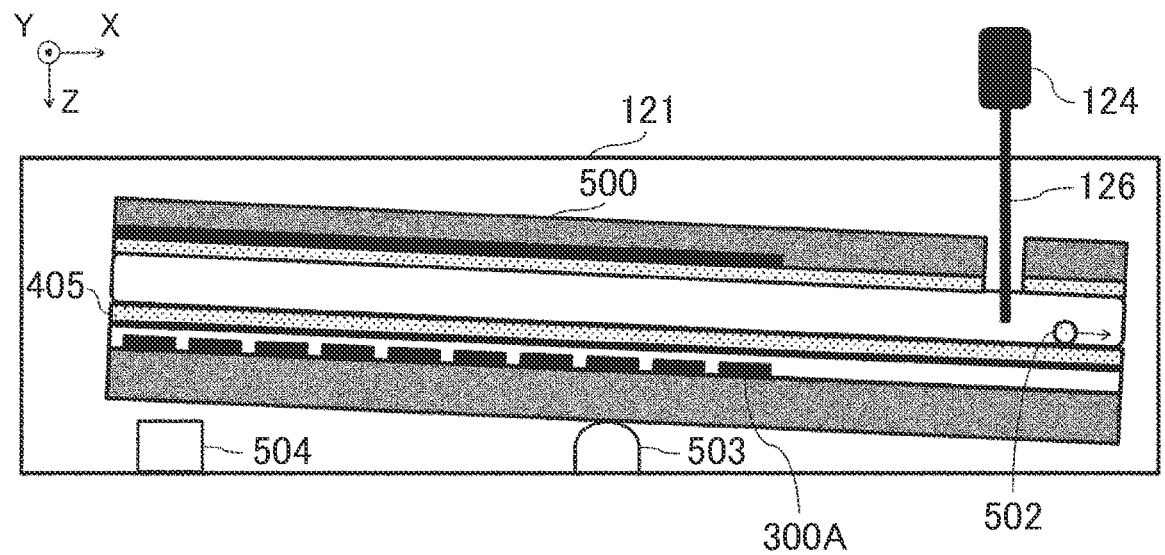
FIG. 9 is a cross sectional view illustrating an operation according to the first embodiment.

FIG. 9 shows the manner in the midway point in which the capillary array 114 leaves the lower water-repellent film 405 and the transport device 500 returns to the horizontal state. The remaining sample droplet 502 after the nucleic acid is taken in the inside of the capillary array 114 moves in the direction of an arrow in FIG. 9 during the inclination of the transport device 500 is inclined, and is discharged from the inside of the transport device 500.

By the present embodiment described above, at the sample take-in unit 306 provided at in the position having a predetermined distance from the EWOD electrode 300A at the tail end of the transport device 500, the nucleic acid in the sample droplet 502 can be taken in the capillary array 114. The sample take-in unit 306 is located at the position at which electrical insulation is kept even in the case in which a voltage necessary to take in the nucleic acid by the capillary array 114 is applied to the load header 124, and thus the dielectric breakdown of the EWOD electrode can be prevented. That is, according to the present embodiment, for taking in the nucleic acid by the capillary array 114, the transport device 500 equipped with the EWOD electrode 300 can be used a plurality of times.

In the present embodiment, the case is described in which nucleic acid, DNA, is specifically handled as an example of a biological sample. However, biological samples handled in the present invention is not limited to this, including general biological materials such as RNA, protein, polysaccharides, and microorganisms For taking in a biological sample, a component the capillary 102 may be used.

Second Embodiment

In the first embodiment, the description is made in which adding the weight of the capillary array 114 causes the transport device 500 to be inclined to move the sample droplet 502 to the sample take-in unit 306. In order to cause the transport device 500 to be inclined, the weight other than the capillary array 114 may be used. Therefore, in the present embodiment, the description will be made that adding a weight other than a capillary array 114 causes a transport device 500 to be inclined.

Figure 10:
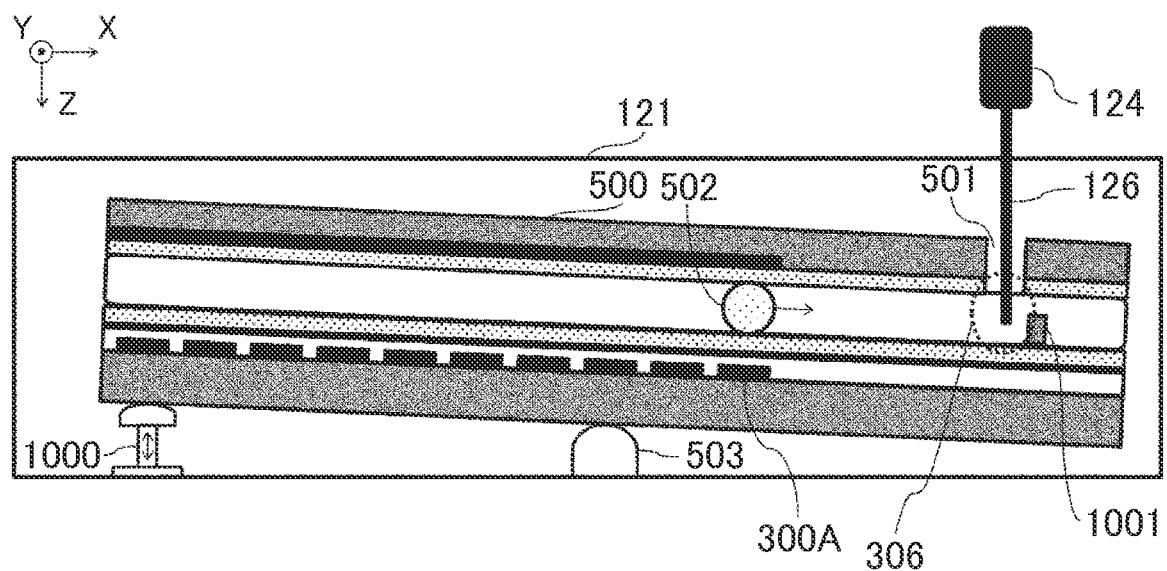
FIG. 10 is a cross sectional view illustrating a sample take-in unit according to a second embodiment.

Referring to FIG. 10, the present embodiment will be described. Similarly to FIG. 5A, FIG. 10 is a X-Z cross sectional view of the transport device 500. Similarly to the first embodiment, the transport device 500 according to the present embodiment has a top plate 401, an upper electrode 402, an upper water-repellent film 403, a lower water-repellent film 405, an insulating film 406, an EWOD electrode 300, an under plate 407, and an opening 501 as well as a droplet detention unit 1001. Similarly to the first embodiment, between the transport device 500 and a biochemical cartridge 121, a pivot 503 is provided, and an elevation device 1000 is provided. Note that the pivot 503 and the elevation device 1000 may be provided between the biochemical cartridge 121 and a moving stage 123. The top plate 401, the upper electrode 402, the upper water-repellent film 403, the lower water-repellent film 405, the insulating film 406, the EWOD electrode 300, the under plate 407, the opening 501, and the pivot 503 are the same as those in the first embodiment, and the description is omitted. The droplet detention unit 1001 is disposed near the opening 501, and is a member that detains the sample droplet 502 at the position of the sample take-in unit 306. The droplet detention unit 1001 may be slid in the Z-direction or in the Y-direction, as necessary.

The elevation device 1000 is a driving device that extends and contrasts from the same height as the pivot 503 in the –Z-direction, being composed of a linear motor and any other component, for example, and is disposed at a position on the –X direction side from the pivot 503. When the elevation device 1000 is at the same height as the pivot 503, the transport device 500 is kept horizontally, whereas when the elevation device 1000 extends in the –Z-direction, the transport device 500 is inclined to the horizontal plane as the contacting part with the pivot 503 is the rotation axis.

Figure 11:
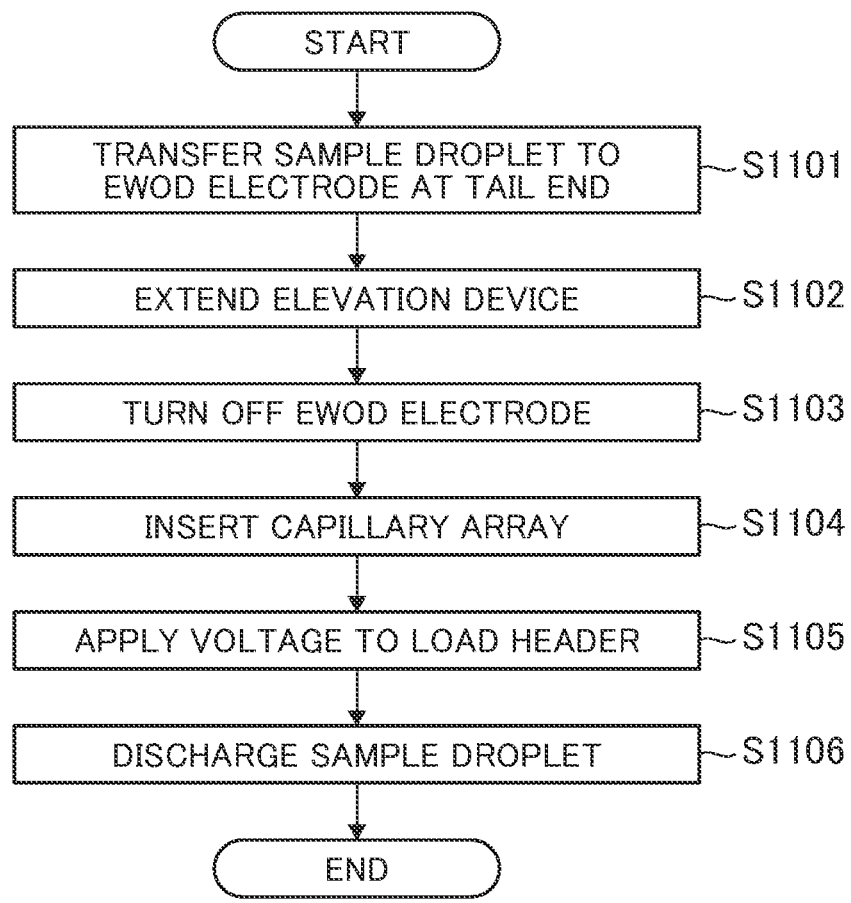
FIG. 11 is a flowchart illustrating an operation according to the second embodiment.

Referring to FIG. 11, an operation according to the present embodiment will be described.

S1101

The application voltage of the transport device 500 to the EWOD electrode 300 is controlled, and the sample droplet 502 is transported to the position of the EWOD electrode 300A at the tail end.

S1102

The elevation device 1000 extends in the –Z-direction. The transport device 500 receives the weight of the elevation device 1000 added in the –Z-direction, and is inclined to the horizontal plane as the contacting part with the pivot 503 is the rotation axis. FIG. 10 shows the manner in which the transport device 500 is inclined. The transport device 500 is inclined, and driving force occurs in the sample droplet 502 in the direction of an arrow in FIG. 10. However, since a voltage is applied to the EWOD electrode 300, the sample droplet 502 is retained at the position of the EWOD electrode 300A at the tail end.

S1103

The application voltage to the EWOD electrode 300 is turned into an off state or a ground state. When the application voltage is turned into the off state or the ground state, the force retaining the sample droplet 502 at the position of the EWOD electrode 300A at the tail end is eliminated, and the sample droplet 502 starts to move in the direction of the arrow in FIG. 10. The sample droplet 502 moves along the top surface of the lower water-repellent film 405, and is detained at the position of the sample take-in unit 306 by the droplet detention unit 1001.

S1104

The capillary array 114 moves in the +Z-direction, and is inserted from the opening 501 into the inside of the transport device 500, and a cathode end 126 of the capillary 102 contacts the sample droplet 502.

S1105

A voltage of a few kilovolts is applied to the load header 124, and the nucleic acid in the sample droplet 502 is taken in the capillary array 114. After a predetermined amount of the nucleic acid in the sample droplet 502 is taken in the inside of the capillary array 114, the application voltage to the load header 124 is turned off.

S1106

The capillary array 114 moves in the –Z-direction, the droplet detention unit 1001 slides in the Z-direction or in the Y-direction, and the remaining sample droplet 502 after the nucleic acid is taken in the inside of the capillary array 114 moves on the inclined plane, and is discharged from the transport device 500. The remaining sample droplet 502 is discharged, and thus the mixture of the remaining sample droplet 502 with a sample droplet 502 to be subsequently transported can be prevented. After the sample droplet 502 is discharged, the elevation device 1000 contrasts to the same height as the pivot 503, and thus the transport device 500 retunes to the horizontal state.

By the present embodiment described above, at the sample take-in unit 306 provided at in the position having a predetermined distance from the EWOD electrode 300A at the tail end of the transport device 500, the nucleic acid in the sample droplet 502 can be taken in the capillary array 114. The sample take-in unit 306 is located at the position at which electrical insulation is kept even in the case in which a voltage necessary to take in the nucleic acid into the capillary array 114 is applied to the load header 124, and thus the dielectric breakdown of the EWOD electrode can be prevented. That is, according to the present embodiment, for taking in the nucleic acid into the capillary array 114, the transport device 500 equipped with the EWOD electrode 300 can be used a plurality of times.

Third Embodiment

In the first embodiment and the second embodiment, the description is made in which the transport device 500 kept horizontally is inclined by adding a weight to move the sample droplet 502 to the sample take-in unit 306. In order to move the sample droplet 502 to the sample take-in unit 306, the sample take-in unit 306 only has to be located at a position lower than the droplet passage having the EWOD electrode 300A at the tail end, and the sample take-in unit 306 only has to be smoothly connected to the droplet passage. Therefore, in the present embodiment, a configuration will be described in which a transport device 500 is inclined, instead of no inclination of the transport device 500 kept horizontally by adding a weight.

Figure 12:
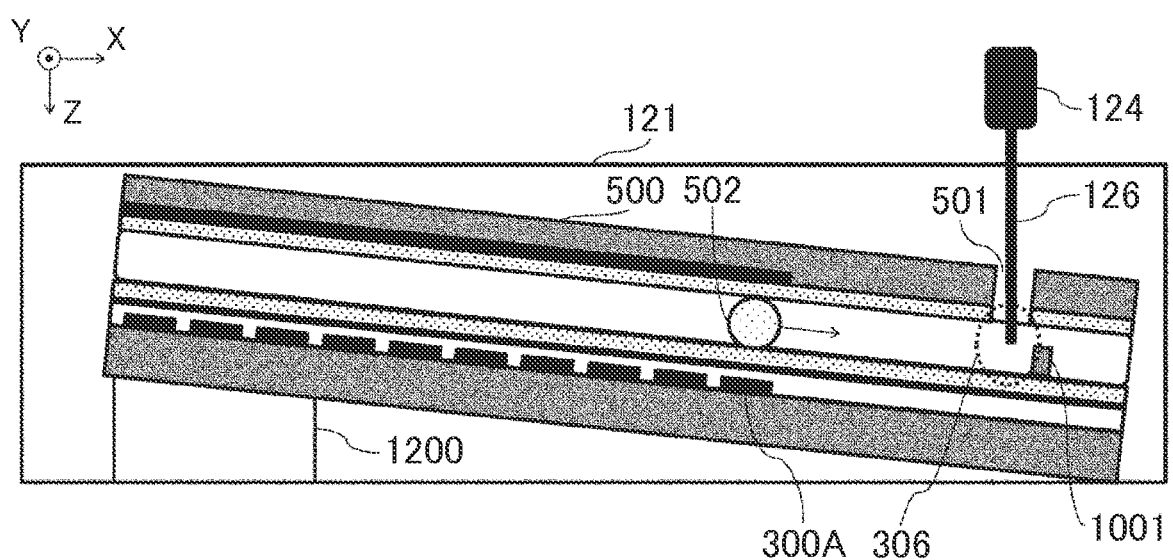
FIG. 12 is a cross sectional view illustrating a sample take-in unit according to a third embodiment.

Referring to FIG. 12, the present embodiment will be described. Similarly FIG. 5A, FIG. 12 is a X-Z cross sectional view of the transport device 500. Similarly to the second embodiment, the transport device 500 according to the present embodiment has a top plate 401, an upper electrode 402, an upper water-repellent film 403, a lower water-repellent film 405, an insulating film 406, an EWOD electrode 300, an under plate 407, an opening 501, and a droplet detention unit 1001. Between the transport device 500 and a biochemical cartridge 121, a trapezoid support unit 1200 is provided. Note that the trapezoid support unit 1200 may be provided between the biochemical cartridge 121 and a moving stage 123. The top plate 401, the upper electrode 402, the upper water-repellent film 403, the lower water-repellent film 405, the insulating film 406, the EWOD electrode 300, the under plate 407, the opening 501, and the droplet detention unit 1001 are the same as those in the second embodiment, and the description is omitted.

The trapezoid support unit 1200 is provided at the end part of the transport device 500 in the –X-direction, and is a member that supports the transport device 500 to be inclined, having a trapezoid shape in a X-Z cross section. The transport device 500 is inclined, a sample take-in unit 306 is at a position lower than the droplet passage having the EWOD electrode 300A at the tail end, and an inclined plane is provided between the droplet passage and the sample take-in unit 306.

Figure 13:
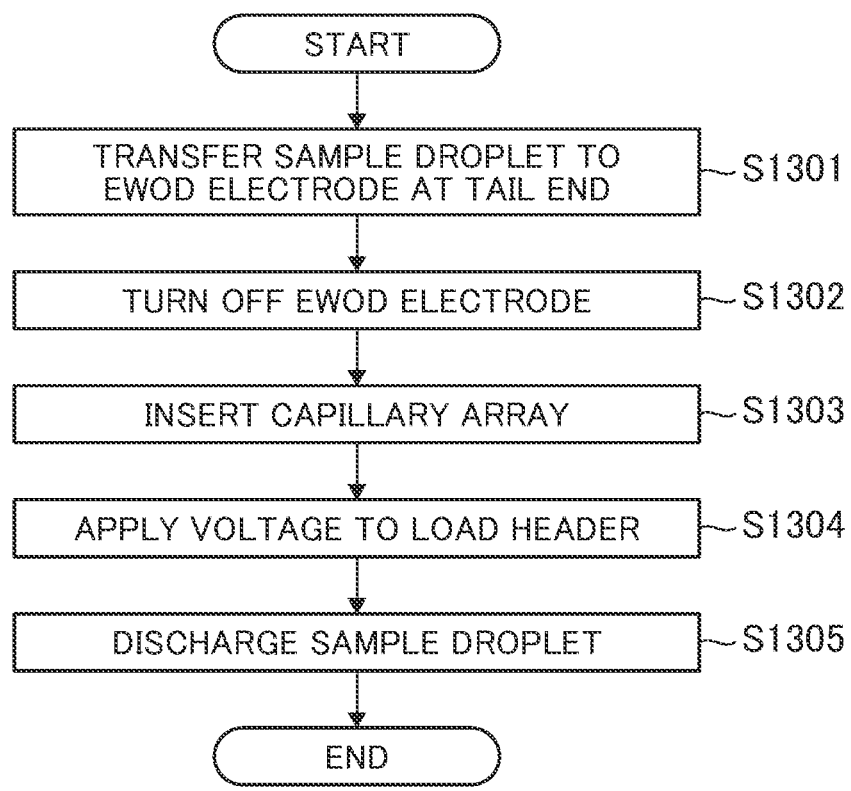
FIG. 13 is a flowchart illustrating an operation according to the third embodiment.

Referring to FIG. 13, an operation according to the present embodiment will be described.

S1301

The application voltage of the transport device 500 to the EWOD electrode 300 is controlled, and a sample droplet 502 is transported to the position of the EWOD electrode 300A at the tail end. The transport device 500 is inclined, and the driving force occurs in the sample droplet 502 in the direction of an arrow in FIG. 12. However, since a voltage is applied to the EWOD electrode 300, the sample droplet 502 is retained at the position of the EWOD electrode 300A at the tail end.

S1302

The application voltage to the EWOD electrode 300 is turned into an off state or a ground state. When the application voltage is turned into the off state or the ground state, the force retaining the sample droplet 502 at the position of the EWOD electrode 300A at the tail end is eliminated, and the sample droplet 502 starts to move in the direction of the arrow in FIG. 12. The sample droplet 502 moves along the top surface of the lower water-repellent film 405, and is detained at the position of the sample take-in unit 306 by the droplet detention unit 1001.

S1303

The capillary array 114 moves in the +Z-direction, and is inserted from the opening 501 into the inside of the transport device 500, and the cathode end 126 of the capillary 102 contacts the sample droplet 502.

S1304

A voltage of a few kilovolts is applied to the load header 124, and the nucleic acid in the sample droplet 502 is taken in the capillary array 114. After a predetermined amount of the nucleic acid in the sample droplet 502 is taken in the inside of the capillary array 114, the application voltage to the load header 124 is turned off.

S1305

The capillary array 114 moves in the −Z-direction, the droplet detention unit 1001 slides in the Z-direction or in the Y-direction, the nucleic acid is taken in the inside of the capillary array 114, and the remaining sample droplet 502 moves on the inclined plane, and is discharged from the transport device 500.

By the present embodiment described above, at the sample take-in unit 306 provided at the position having a predetermined distance from the EWOD electrode 300A at the tail end of the transport device 500, the nucleic acid in the sample droplet 502 can be taken in the capillary array 114. The sample take-in unit 306 is located at the position at which electrical insulation is kept even in the case in which a voltage necessary to take in the nucleic acid by the capillary array 114 is applied to the load header 124, and thus the dielectric breakdown of the EWOD electrode can be prevented. That is, according to the present embodiment, for taking in the nucleic acid by the capillary array 114, the transport device 500 equipped with the EWOD electrode 300 can be used a plurality of times.

According to the present embodiment, no driving device like the elevation device 1000 is included, and thus a configuration simpler than the second embodiment can be provided.

Fourth Embodiment

In the third embodiment, the configuration in which the overall transport device 500 is inclined is described. In order to move the sample droplet 502 to the sample take-in unit 306, the sample take-in unit 306 only has to be located at a position lower than the droplet passage having the EWOD electrode 300A at the tail end, and a surface smoothly connecting the sample take-in unit 306 to the droplet passage only has to be provided. Therefore, in the present embodiment, a configuration will be described in which a part of a transport device 500 is kept horizontally and an inclined plane inclined to the horizontal plane is provided between a droplet passage and a sample take-in unit 306, instead of no inclination of the overall transport device 500.

Figure 14:
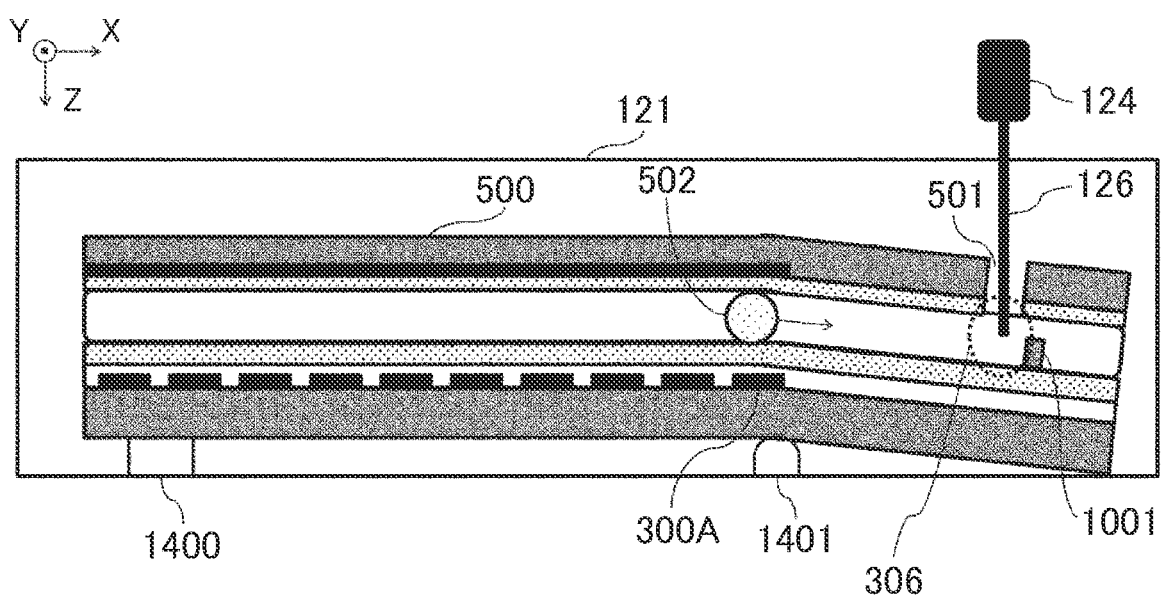
FIG. 14 is a cross sectional view illustrating a sample take-in unit according to a fourth embodiment.

Referring to FIG. 14, the present embodiment will be described. Similarly to FIG. 5A, FIG. 14 is a X-Z cross sectional view of the transport device 500. Similarly to the second embodiment, the transport device 500 according to the present embodiment has a top plate 401, an upper electrode 402, an upper water-repellent film 403, a lower water-repellent film 405, an insulating film 406, an EWOD electrode 300, an under plate 407, an opening 501, and a droplet detention unit 1001. Between the transport device 500 and a biochemical cartridge 121, a first support unit 1400 and a second support unit 1401 are provided. The upper electrode 402, the EWOD electrode 300, the opening 501, and the droplet detention unit 1001 are the same as those in the second embodiment, and the description is omitted.

The top plate 401, the upper water-repellent film 403, the lower water-repellent film 405, the insulating film 406, and the under plate 407 have a structure smoothly bent at the position of an EWOD electrode 300A at the tail end. That is, the top plate 401, the upper water-repellent film 403, the lower water-repellent film 405, the insulating film 406, and the under plate 407 are kept horizontally in a region in which the upper electrode 402 and the EWOD electrode 300 are provided, and have an inclined plane in regions other than that region. The transport device 500 has such an inclined plane, and thus the sample take-in unit 306 is disposed at a position lower than the droplet passage having the EWOD electrode 300A at the tail end. The area between the droplet passage and the sample take-in unit 306 is smoothly connected by the lower water-repellent film 405. Note that the area between the droplet passage and the sample take-in unit 306 is not limited to a flat surface as shown in FIG. 14, and the area may be a curved surface.

The first support unit 1400 and the second support unit 1401 are members that support the transport device 500. The first support unit 1400 is provided at the end part of the transport device 500 in the −X-direction, the second support unit 1401 is provided at a position at which the transport device 500 is smoothly bent.

The operation according to the present embodiment is the same as the operation of the third embodiment, and follows the flowchart shown in FIG. 13, and the description is omitted.

By the present embodiment described above, at the sample take-in unit 306 provided at in the position having a predetermined distance from the EWOD electrode 300A at the tail end of the transport device 500, the nucleic acid in the sample droplet 502 can be taken in the capillary array 114. The sample take-in unit 306 is located at the position at which electrical insulation is kept even in the case in which a voltage necessary to take in the nucleic acid by the capillary array 114 is applied to the load header 124, and thus the dielectric breakdown of the EWOD electrode can be prevented. That is, according to the present embodiment, for taking in the nucleic acid by the capillary array 114, the transport device 500 equipped with the EWOD electrode 300 can be used a plurality of times.

According to the present embodiment, the part having the EWOD electrode 300 is kept horizontally, and the process up to obtaining the sample droplet 502 is no affected by the influence of gravity, and thus control over the EWOD electrode 300 is made easier than in the third embodiment.

Note that the biochemical analysis device according to the present invention is not limited to the foregoing embodiments, and can be embodied with the components modified in the scope not deviating from the gist of the invention. A plurality of components disclosed in the foregoing embodiments may be appropriately combined. Some components may be removed from all the components shown in the foregoing embodiments.

REFERENCE SIGNS LIST

101: device main body
102: capillary
103: pump mechanism
104: high-voltage power supply
105: syringe
106: gel block
107: separation medium container
108: anode buffer container
109: anode electrode
110: motor-operated valve
111: light source
112: optical detector
113: detecting unit
114: capillary array
115: thermostat
116: fan
117: heater
118: buffer container
119: washing container
120: waste fluid container
121: biochemical cartridge
122: conveyer
123: moving stage
124: load header
125: control computer
126: cathode end
127: control substrate
128: optical data
129: capillary head
300: EWOD electrode
301: sample chamber
302: reagent chamber
303: sample passage
304: reagent passage
305: temperature control region
306: sample take-in unit
400: droplet
401: top plate
402: upper electrode
403: upper water-repellent film
404: fluid
405: lower water-repellent film
406: insulating film
407: under plate
500: transport device
501: opening
502: sample droplet
503: pivot
504: support unit
505: groove
1000: elevation device
1001: droplet detention unit
1200: trapezoid support unit
1400: first support unit
1401: second support unit

The invention claimed is:

1. A biochemical cartridge comprising:
a droplet passage on which a plurality of EWOD electrodes is arranged along a direction in which a sample droplet that is a droplet including a biological sample is transported, the plurality of EWOD electrodes configured to transport the sample droplet;
a sample take-in unit having a predetermined distance from an EWOD electrode at a tail end of the droplet passage, the sample take-in unit being provided at a position at which the biological sample in the sample droplet is taken in;
a transport device comprising the droplet passage and the sample take-in unit, a linear passage for the sample droplet within the transport device extending in an x-axis direction through the droplet passage and across the predetermined distance to the sample take-in unit;
wherein when the biological sample is taken in, the sample take-in unit is located at a position lower than the droplet passage having the EWOD electrode at the tail end, and an area between the droplet passage and the sample take-in unit is smoothly connected.

2. The biochemical cartridge according to claim 1, wherein: the transport device is kept horizontally when the transport device does not receive weight the transport device is kept horizontally when the transport device does not receive a weight, whereas the transport device receives the weight to be inclined when the biological sample is taken in.

3. The biochemical cartridge according to claim 2, wherein the transport device is inclined by receiving the weight added by a capillary array configured to take in the biological sample.

4. The biochemical cartridge according to claim 1, wherein a groove is provided between the droplet passage and the sample take-in unit.

5. The biochemical cartridge according to claim 1, wherein the sample take-in unit has a droplet detention member configured to detain the sample droplet.

6. The biochemical cartridge according to claim 5, wherein after the sample droplet is taken in, the droplet detention member slides.

7. The biochemical cartridge according to claim 1, wherein the transport device is inclined relative to a horizontal plane.

8. The biochemical cartridge according to claim 1, wherein: the droplet passage is kept horizontally; and an area between the droplet passage and the sample take-in unit is inclined relative to the horizontal plane.

9. The biochemical cartridge according to claim 1, wherein a distance from the EWOD electrode at the tail end to the sample take-in unit is a distance that keeps electrical insulation between the sample take-in unit and the EWOD electrode at the tail end to an application voltage for taking in the biological sample.

10. The biochemical cartridge according to claim 1, further comprising:
an opening extending vertically through the transport device to the sample take-in unit, the transport device configured to receive a weight at the sample take-in unit through the opening, the transport device inclined based upon the weight when the biological sample is taken in.

11. A biochemical analysis device that takes in a biological sample for analysis, the device including a biochemical cartridge comprising:
a droplet passage on which a plurality of EWOD electrodes is arranged along a direction in which a sample droplet that is a droplet including the biological sample is transported, the plurality of EWOD electrodes configured to transport the sample droplet;
a sample take-in unit having a predetermined distance from an EWOD electrode at a tail end of the droplet passage, the sample take-in unit being provided at a position at which the biological sample in the sample droplet is taken in;
a transport device comprising the droplet passage and the sample take-in unit, a linear passage for the sample droplet within the transport device extending in an x-axis direction through the droplet passage and across the predetermined distance to the sample take-in unit;
a pivot disposed between the biochemical cartridge and the transport device, the pivot configured to rotatably support the transport device about a y-axis at a position on an +x-direction side from a center of gravity of the transport device; and
a weight added by a capillary array configured to take in the biological sample;
wherein when the biological sample is taken in, the sample take-in unit is located at a position lower than the droplet passage having the EWOD electrode at the tail end, and an area between the droplet passage and the sample take-in unit is smoothly connected.

12. The biochemical cartridge according to claim 11, wherein: the transport device is kept horizontally when the transport device does not receive the weight added by the capillary array whereas the transport device receives the weight added by the capillary array to be inclined when the biological sample is taken in.

13. The biochemical cartridge according to claim 12, wherein the transport device is inclined by receiving the weight added by the capillary array configured to take in the biological sample.

14. The biochemical analysis device according to claim 11,
wherein a groove is provided between the droplet passage and the sample take-in unit.

15. The biochemical analysis device according to claim 11,
wherein the sample take-in unit has a droplet detention member configured to detain the sample droplet.

16. The biochemical cartridge according to claim 15, wherein after the sample droplet is taken in, the droplet detention member slides.

17. The biochemical cartridge according to claim 11, wherein the transport device is inclined relative to a horizontal plane.

18. The biochemical analysis device according to claim 11,
wherein: the droplet passage is kept horizontally; and
an area between the droplet passage and the sample take-in unit is inclined relative to the horizontal plane.

19. The biochemical analysis device according to claim 11,
wherein a distance from the EWOD electrode at the tail end to the sample take-in unit is a distance that keeps electrical insulation between the sample take-in unit and the EWOD electrode at the tail end to an application voltage for taking in the biological sample.

20. The biochemical analysis device according to claim 11, further comprising:
an opening extending vertically through the transport device to the sample take-in unit, the transport device configured to receive the weight at the sample take-in unit through the opening, the transport device inclined based upon the weight when the biological sample is taken in.

* * * * *